(No Model.)
T. H. SPRINGER.
STEP BEARING.
No. 588,117. Patented Aug. 10, 1897.
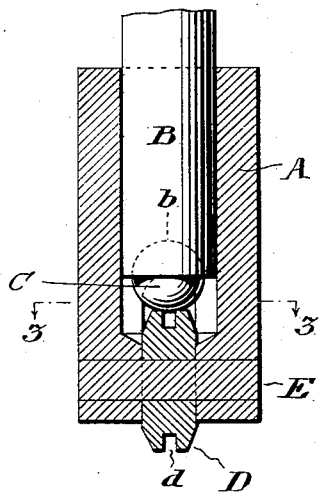
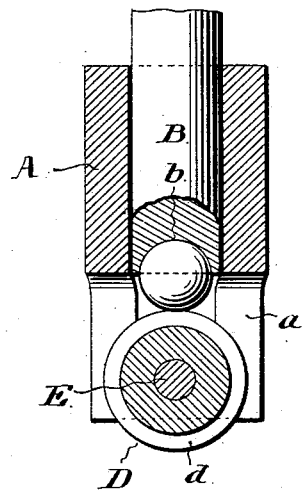
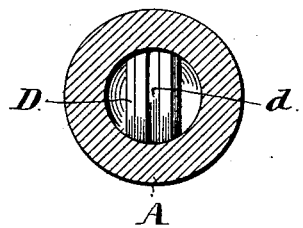
WITNESSES:
A. E. Paige
James H. Bell
INVENTOR:
Thomas H. Springer
By Tracy & Paul
Attorneys

UNITED STATES PATENT OFFICE.

THOMAS H. SPRINGER, OF PHILADELPHIA, PENNSYLVANIA, ASSIGNOR TO THE SPRINGER SEPARATOR COMPANY, OF PENNSYLVANIA.

STEP-BEARING.

SPECIFICATION forming part of Letters Patent No. 588,117, dated August 10, 1897.

Application filed November 19, 1896. Serial No. 612,687. (No model.)

*To all whom it may concern:*

Be it known that I, THOMAS H. SPRINGER, of Philadelphia, in the State of Pennsylvania, have invented certain new and useful Improvements in Step-Bearings, whereof the following is a specification, reference being had to the accompanying drawings.

My invention is well adapted for use in connection with the supporting-spindles of centrifugal separators, and in the accompanying drawings I have illustrated its application to such a spindle. I do not, however, limit my claim to this particular embodiment, as it is obviously adapted to other bearings in different classes of machinery.

In said drawings, Figure 1 is a partial vertical longitudinal section through the axis of such a step-bearing, showing the adjacent end portion of the spindle. Fig. 2 is a similar vertical section on a plane at right angles to that of Fig. 1. Fig. 3 is a transverse section on the line 3 3 of Fig. 1.

The objects of my invention are to prolong the life of the bearing as a whole, to facilitate the accurate setting up of the device, and to maintain the parts in the proper relation to insure a minimum of friction.

The tubular socket of the bearing A is formed with a bifurcated lower end, as shown at $a$. The casing or support for said socket is not shown, since it does not relate to the present invention and may be of any desired character. The spindle B fits freely within said socket A and rests upon a ball C, preferably of hardened steel, the lower end of the spindle being concave, as indicated at $b$. Said ball in turn is supported upon a disk D, rotatably mounted upon a pin E, which passes through the lower portion of the socket A. The axis of rotation of the disk is thus transverse to the axis of rotation of the spindle. The periphery of the disk D is preferably provided with a groove $d$, which may be of rectangular cross-section, as indicated, and the disk itself may conveniently be formed of phosphor-bronze or other metal softer than the metal of the ball C.

In operation the bearing-surfaces are maintained in a highly-lubricated condition, usually by immersing them in a bath of oil in the usual manner. The antifriction support afforded by the ball C is of course similar to that in previous bearings of the same general character; but as heretofore employed these bearings have been open to the objection that the ball soon wore a depression of more or less depth in the subjacent supporting-surface and the increased friction was so great as to cause adhesion and sometimes the melting of one of the proximate surfaces.

By the use of my invention when the supporting-surface of the disk D at its point of contact with the ball C becomes worn a very slight rotating movement of the seat upon its axis E will present a fresh bearing-surface for the ball, so that the operator by observing the condition of the surface and slightly turning the disk from time to time can preserve the bearing in a perfectly efficient condition for a long period.

The disk itself when completely worn out can of course be readily replaced by another, it being only necessary to drive out the axis E, remove the disk through one of the lateral openings $a$, and drop another one into place for the insertion of the axis.

The peripheral groove $d$ enables the ball when dropped into the socket to seat itself immediately in a plane which in one direction is axial with relation to the spindle.

I am aware that the use of a ball as a step-bearing for spindles is common and that a removable rotary support for such balls has been used in the sockets of such bearings. I therefore do not broadly claim either of these features.

Having thus described my invention, I claim—

The combination, with a socket having a transversely slotted or bifurcated lower end provided on the arms of the fork thus formed with transverse apertures, of a shaft mounted removably in said apertures, a vertical disk turning on said shaft within said bifurcation and removable laterally or downwardly therethrough upon the removal of said axle, a ball resting on the upper edge of the disk, and a spindle resting on the ball, substantially as described.

T. H. SPRINGER.

Witnesses:
G. HERBERT JENKINS,
JAMES H. BELL.